(12) United States Patent
Sanghavi et al.

(10) Patent No.: US 11,647,241 B2
(45) Date of Patent: May 9, 2023

(54) ERROR DE-EMPHASIS IN LIVE STREAMING

(71) Applicant: Sony Interactive Entertainment LLC, San Mateo, CA (US)

(72) Inventors: Bhumik Sanghavi, Santa Clara, CA (US); Joel Freeman, San Rafel, CA (US); Alex Hwang, Orinda, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 208 days.

(21) Appl. No.: 16/501,106

(22) Filed: Feb. 19, 2019

(65) Prior Publication Data

US 2020/0267434 A1 Aug. 20, 2020

(51) Int. Cl.
| | |
|---|---|
| *H04N 7/16* | (2011.01) |
| *H04N 21/2662* | (2011.01) |
| *H04N 21/2187* | (2011.01) |
| *H04N 21/2343* | (2011.01) |
| *H04N 21/262* | (2011.01) |
| *H04N 21/414* | (2011.01) |

(52) U.S. Cl.
CPC ..... *H04N 21/2662* (2013.01); *H04N 21/2187* (2013.01); *H04N 21/234345* (2013.01); *H04N 21/26258* (2013.01); *H04N 21/414* (2013.01)

(58) Field of Classification Search
CPC ........... H04N 21/2662; H04N 21/2187; H04N 21/234345; H04N 21/26258; H04N 21/414; H04N 21/222; H04N 21/6581; H04N 21/4302; H04N 21/2393; H04N 21/23106; H04N 21/44209; H04N 21/4425; H04N 21/6377; H04N 21/8456
See application file for complete search history.

(56) References Cited

U.S. PATENT DOCUMENTS

| | | | |
|---|---|---|---|
| 6,246,827 B1 * | 6/2001 | Strolle | H04N 9/898 386/E9.03 |
| 8,244,874 B1 * | 8/2012 | Thireault | G06F 9/5072 709/226 |
| 9,639,629 B1 * | 5/2017 | Venkat | G06F 16/80 |
| 10,536,741 B1 * | 1/2020 | Madison | H04N 21/43076 |
| 10,743,036 B1 * | 8/2020 | Farris | H04N 21/251 |
| 2006/0268995 A1 * | 11/2006 | Hirayama | H04N 21/4425 375/240.27 |

(Continued)

OTHER PUBLICATIONS

Pantos, R.P. "HTTP Live Streaming," Request for Comments 8216, Network Working Group: 1, Available at: https://tools.ietf.org/html/rfc8216 (Aug. 2017).

(Continued)

*Primary Examiner* — Annan Q Shang
(74) *Attorney, Agent, or Firm* — JDI Patent; Joshua Isenberg; Robert Pullman

(57) ABSTRACT

A Reductive Edging device and computer program product. The Reductive Edging device has a processor, memory coupled to the processor and non-transitory instructions embedded in the memory that when executed by the processor causes the device to perform a method for reductive edging. The method includes, prior to sending a media segment to a client device, performing error de-emphasis operations and sending information associated with error de-emphasis.

30 Claims, 12 Drawing Sheets

(56) References Cited

U.S. PATENT DOCUMENTS

| | | | | |
|---|---|---|---|---|
| 2009/0009532 | A1* | 1/2009 | Hallberg | H04N 21/4622 345/636 |
| 2009/0031424 | A1* | 1/2009 | Ganesan | H04N 21/4331 726/26 |
| 2010/0299722 | A1* | 11/2010 | Tewari | H04L 67/101 726/3 |
| 2010/0318630 | A1* | 12/2010 | Howell | G06F 9/5055 709/218 |
| 2011/0066676 | A1* | 3/2011 | Kleyzit | H04L 67/02 709/203 |
| 2013/0042015 | A1* | 2/2013 | Begen | H04N 21/6125 709/231 |
| 2013/0142226 | A1* | 6/2013 | Sasaki | H04L 1/241 375/219 |
| 2014/0280906 | A1* | 9/2014 | Johns | H04L 45/28 709/224 |
| 2014/0380050 | A1* | 12/2014 | Dharmarajan | H04L 63/061 713/168 |
| 2015/0365450 | A1* | 12/2015 | Gaunt | H04L 65/65 709/231 |
| 2016/0182582 | A1* | 6/2016 | Wagenaar | H04L 65/65 709/231 |
| 2016/0373546 | A1* | 12/2016 | Lotfallah | H04N 21/6131 |
| 2017/0041362 | A1* | 2/2017 | Lee | H04L 65/4076 |
| 2017/0116349 | A1 | 4/2017 | Steiner et al. | |
| 2017/0133023 | A1* | 5/2017 | Disch | G10L 19/24 |
| 2017/0171287 | A1* | 6/2017 | Famaey | H04L 65/65 |
| 2017/0195450 | A1* | 7/2017 | Su | H04N 21/433 |
| 2017/0213561 | A1* | 7/2017 | Faure | G10L 19/005 |
| 2017/0289223 | A1 | 10/2017 | Kipp et al. | |
| 2017/0374151 | A1* | 12/2017 | Moorthi | H04L 67/1097 |
| 2018/0176297 | A1 | 6/2018 | DiVincenzo et al. | |
| 2018/0220171 | A1* | 8/2018 | Davies | H04N 21/262 |
| 2018/0331908 | A1 | 11/2018 | Gal et al. | |
| 2019/0182554 | A1* | 6/2019 | Schupak | H04L 65/4076 |
| 2021/0152872 | A1* | 5/2021 | Maurice | H04N 21/222 |

OTHER PUBLICATIONS

Saamer Akhshabi et al, "An Experimental Evaluation of Rate-Adaptation Algorithms in Adaptive Streaming over HTTP", MMSys'11, Proceedings of the second annual ACM conference on Multimedia systems. Feb. 23-25, 2011, San Jose, California, USA, pp. 157-168, 2011 ACM, New York, NY.

Stanley, Greg, "The 'MACD Approach' to Derivative (Rate of Change) Estimation" available at:http://gregstanleyandassociates. com/whitepapers/FaultDiagnosis/Filtering/MACDapproach/macd-approach.htm (2017).

U.S. Appl. No. 16/191,341 to Bhumik Sanghavi et al., filed Nov. 14, 2018.

International Search Report and Written Opinion dated May 13, 2020 for International Patent Application PCT/US2020/017978.

* cited by examiner

MEDIA PLAYLIST 1

MEDIA PLAYLIST 2

ERROR DE-EMPHASIS IN LIVE STREAMING

FIELD OF THE DISCLOSURE

The present disclosure relates online media streaming. Specifically the present disclosure relates to enhancement of HTTP Live Streaming (HLS).

BACKGROUND OF THE INVENTION

Over the top video streaming is becoming ever more popular in comparison to television. While popular, over the top (OTT) video streaming does have several downsides in comparison to broadcast and cable television. Specifically adaptive bitrate streaming, e.g., adaptive bitrate streaming, requires a connection handshaking and playlist collection.

Additionally, streaming video applications must download and buffer the video data and its related manifests before the video can be played. During the download and buffering of video data, a number of different events may cause the streaming video device to fail. These failures can be frustrating to users especially if the failure occurs while in the middle of streaming.

It is within this context that embodiments of the present disclosure arise.

BRIEF DESCRIPTION OF THE DRAWINGS

The aspects of the present disclosure can be readily understood by considering the following detailed description in conjunction with the accompanying drawings, in which.

DESCRIPTION OF THE SPECIFIC EMBODIMENTS

Figure 1A:
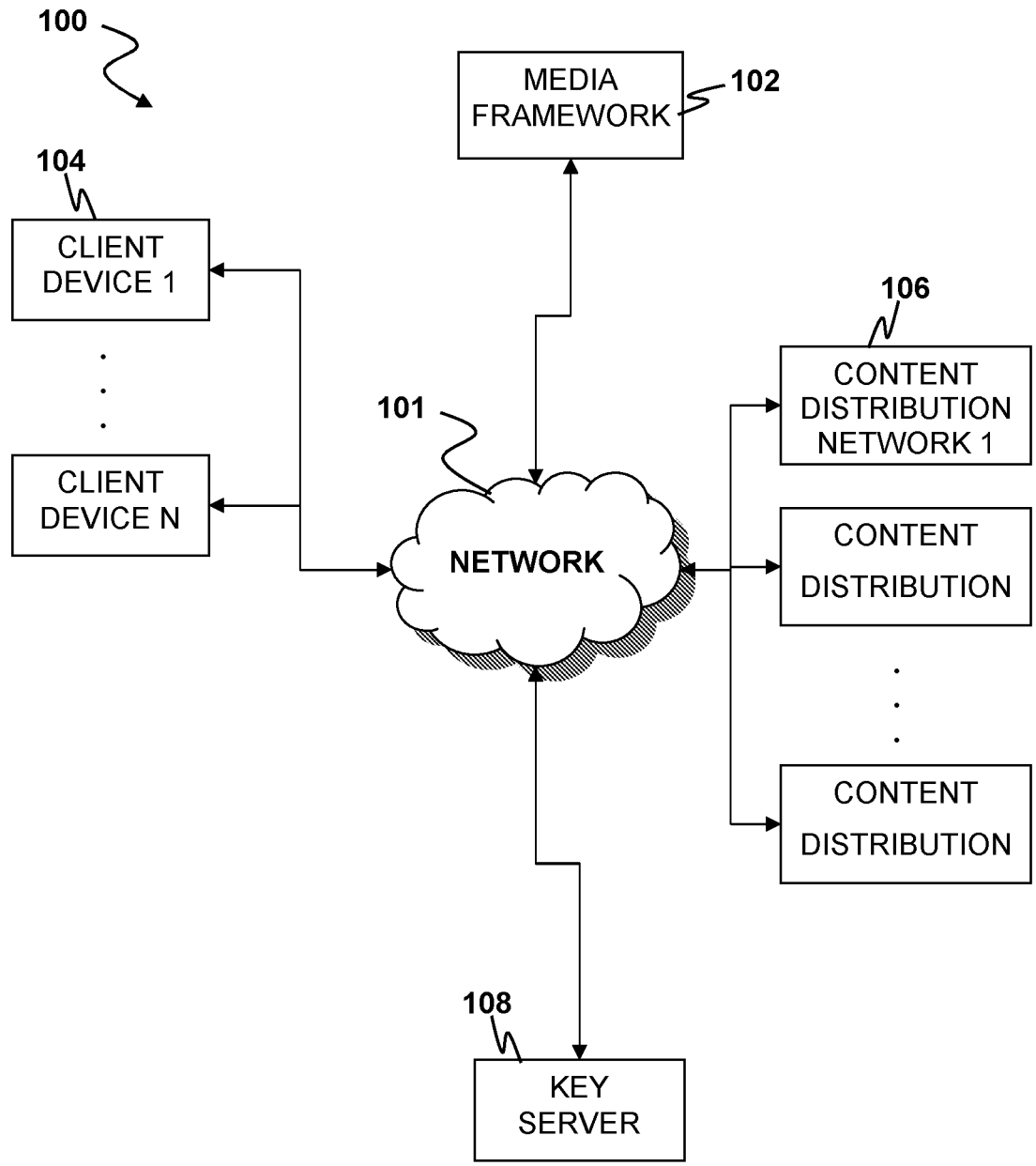
FIG. 1A depicts the general architecture of an adaptive bit rate (ABR) multimedia streaming system.

Although the following detailed description contains many specific details for the purposes of illustration, anyone of ordinary skill in the art will appreciate that many variations and alterations to the following details are within the scope of the disclosure. Accordingly, examples of embodiments of the disclosure described below are set forth without any loss of generality to, and without imposing limitations upon, the claimed disclosure.

While numerous specific details are set forth in order to provide a thorough understanding of embodiments of the disclosure, it will be understood by those skilled in the art that other embodiments may be practiced without these specific details. In other instances, well-known methods, procedures, components and circuits have not been described in detail so as not to obscure the present disclosure. Some portions of the description herein are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm, as used herein, is a self-consistent sequence of actions or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated or otherwise as apparent from the following discussion, it is to be appreciated that throughout the description, discussions utilizing terms such as "processing", "computing", "converting", "reconciling", "determining" or "identifying," refer to the actions and processes of a computer platform which is an electronic computing device that includes a processor which manipulates and transforms data represented as physical (e.g., electronic) quantities within the processor's registers and accessible platform memories into other data similarly represented as physical quantities within the computer platform memories, processor registers, or display screen.

A computer program may be stored in a computer readable storage medium, such as, but not limited to, any type of disk including floppy disks, optical disks (e.g., compact disc read only memory (CD-ROMs), digital video discs (DVDs), Blu-Ray Discs™, etc.), and magnetic-optical disks, read-only memories (ROMs), random access memories (RAMs), EPROMs, EEPROMs, magnetic or optical cards, flash memories, or any other type of non-transitory media suitable for storing electronic instructions.

Introduction

Aspects of the present disclosure address the drawbacks associated with existing adaptive bitrate streaming systems through use of a reductive edger to address parity performance issues in a cross-platform client environment. Video is consumed on variety of client devices that may have different capability when it comes to handling adaptive bitrate streaming. In particular, ABR implementations are generally different across different devices and performance can be noticeably different for one device compared to another. While ABR implementations for different devices do attempt to achieve similar (not always identical) goals, performances vary.

The problem, referred to herein as the "edging" problem is how to make all these cross-platform clients equally capable of accessing content hosted by a content delivery network (CDN). It is not likely or reasonable to assume these devices can all implement all advanced edging techniques. Reductive Edging architecture according to aspects of the present disclosure provides edge intelligence in a component external to client devices or client applications so the client can capably use advanced edging technology without having to radically reconfigure a client device or application. One of the objectives of Reductive Edging in accordance with aspects of the present disclosure is to achieve ABR parity across platforms.

A related issue is one of "playback robustness", i.e., the ability of a client device or application to handle adaptive bitrate streams efficiently. This is non-trivial, especially in dealing with fringe syntax and features, latency, errors, adaptive bit rate, etc. This is even more complex than the edging issue.

Reductive Edging techniques, as described herein, relieve client devices and applications of edging and robustness responsibilities and allows them to perform well at simpler tasks. A Reductive Edger that takes over these responsibilities is the salient feature of aspects of the present disclosure.

Adaptive Bitrate Streaming Architecture

FIG. 1A shows the general architecture of an adaptive bit rate (ABR) multimedia streaming system 100. Examples of common protocols for ABR streaming multimedia on personal computers, set-top television devices, phones, and tablets include HTTP Live streaming (HLS) and Dynamic Adaptive Streaming over HTTP (DASH). The multimedia streaming system 100 comprises a media framework 102, a content distribution network and server 106, Key server 108, and client devices 104 connected over a network 101.

The content distribution network (CDN) 106 comprises multiple servers and data servers that are configured to provide efficient multi-media content to geographically dispersed client devices 104 over the network 101. The Key server 108 provides encryption keys to the client devices 104. The encryption keys are used to decrypt the media content from the CDN 106, which may be, encrypted for digital rights management (DRM) purposes. The Media Framework 102 provides the network 101 location of the video content delivered by the CDN 106 through a Uniform Resource Locator (URL) or the like.

Figure 1B:
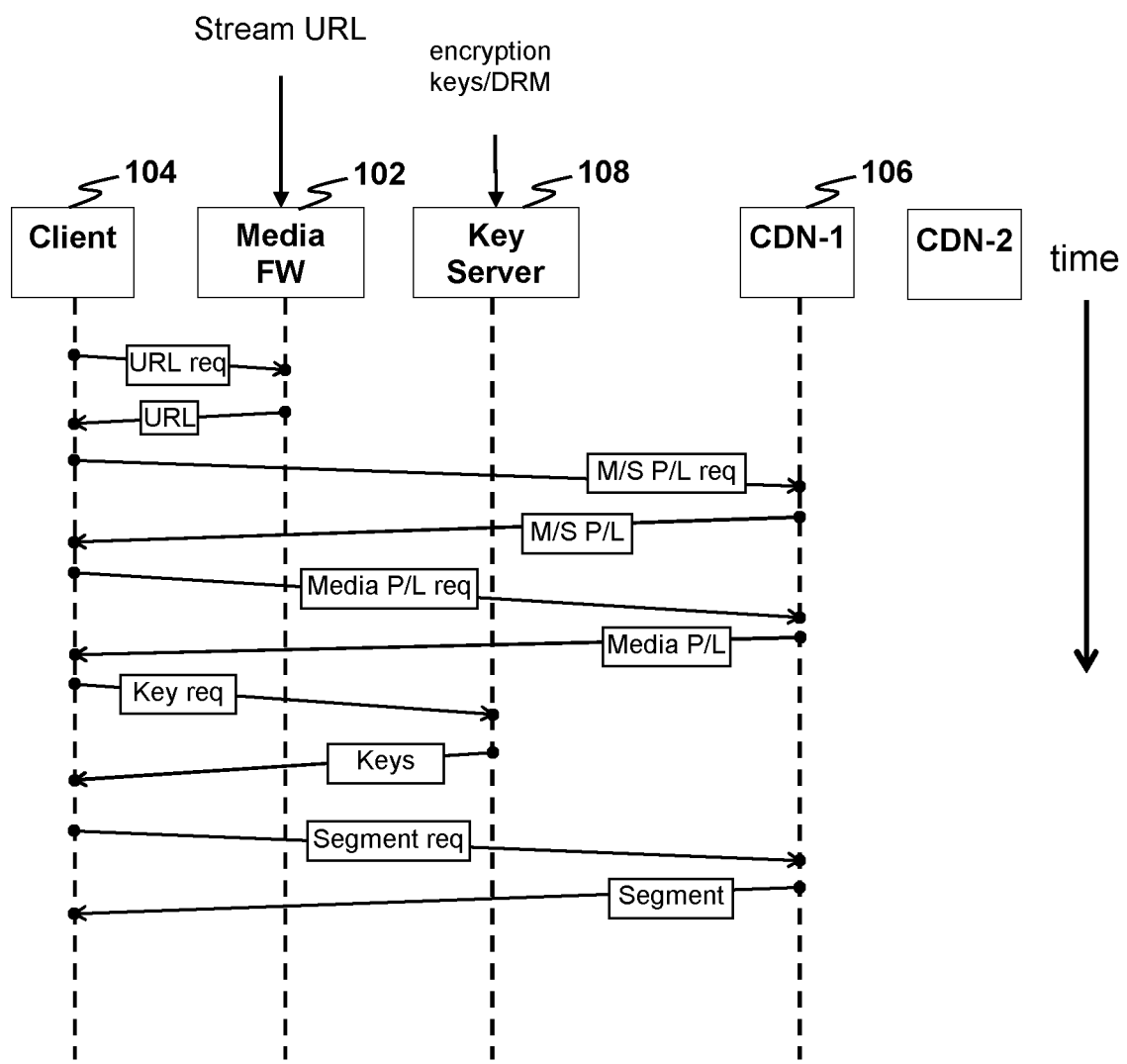
FIG. 1B is a flow diagram showing the operation of a prior art client device in the HLS system.

FIG. 1B shows the operation of a prior art client device in the HLS system 100. Before media can be played on the client device 104, the client device 104 sends a request to the media framework 102 for the location of a media stream on the CDN 106. The media framework 102 sends the location of the CDN 106 back to the client device 104. This location may be, for example and without the limitation, in the form of a URL, internet protocol address (IP address) or similar.

The client device 104 then contacts the CDN 106 with a request for the Master Playlist. The Master Playlist provides a list containing the locations of the media presentation at different bitrates, in different formats or with alternate renditions of the content. The CDN 106 then responds by sending the Master Playlist back to the client device 104.

The client device 104 may then choose a particular rendition of a media presentation. This may be done via the client's ABR mechanism to computationally and dynamically determine the optimal bit rate selection and corresponding rendition. In response to a choice of rendition the client device 104 sends a request to the CDN 106 for a media playlist, The media playlist provides a list containing the location of the keys and video segments of the media presentation at a particular format, bit-rate, etc. The CDN 106 sends the media playlist and it is received at the client device 104.

In preparation for media playback of an encrypted stream, the client device 104 may contact a key server 108 by sending a request for encryption key specific to the media presentation video segments. The key server 108 then sends the requested key, which is received by the client device 104. This procedure is optional as not all streams are encrypted, and with other forms of security there may not be keys.

The client device begins streaming the media presentation by sending a request for a media segment to the CDN 106. The CDN 106 in kind begins sending media segments, which are received at the client device 104. The media segments are encoded audio, closed captioning data, metadata and control data and/or video segments of a media presentation that when played together in sequence creates the full-length media presentation. The media segments may be encoded, in which case the client device may use the key received from the key server to decrypt the media segment and begin playback. For more information on the HLS system architecture see: Pantos, R. P. "HTTP Live Streaming," Request for Comments 8216, Network Working Group: 1, Available at: https://tools.ietf.org/html/rfc8216 (August 2017) which is incorporated herein by reference.

Reductive Edgeing Enhanced Streaming

Figure 2A:
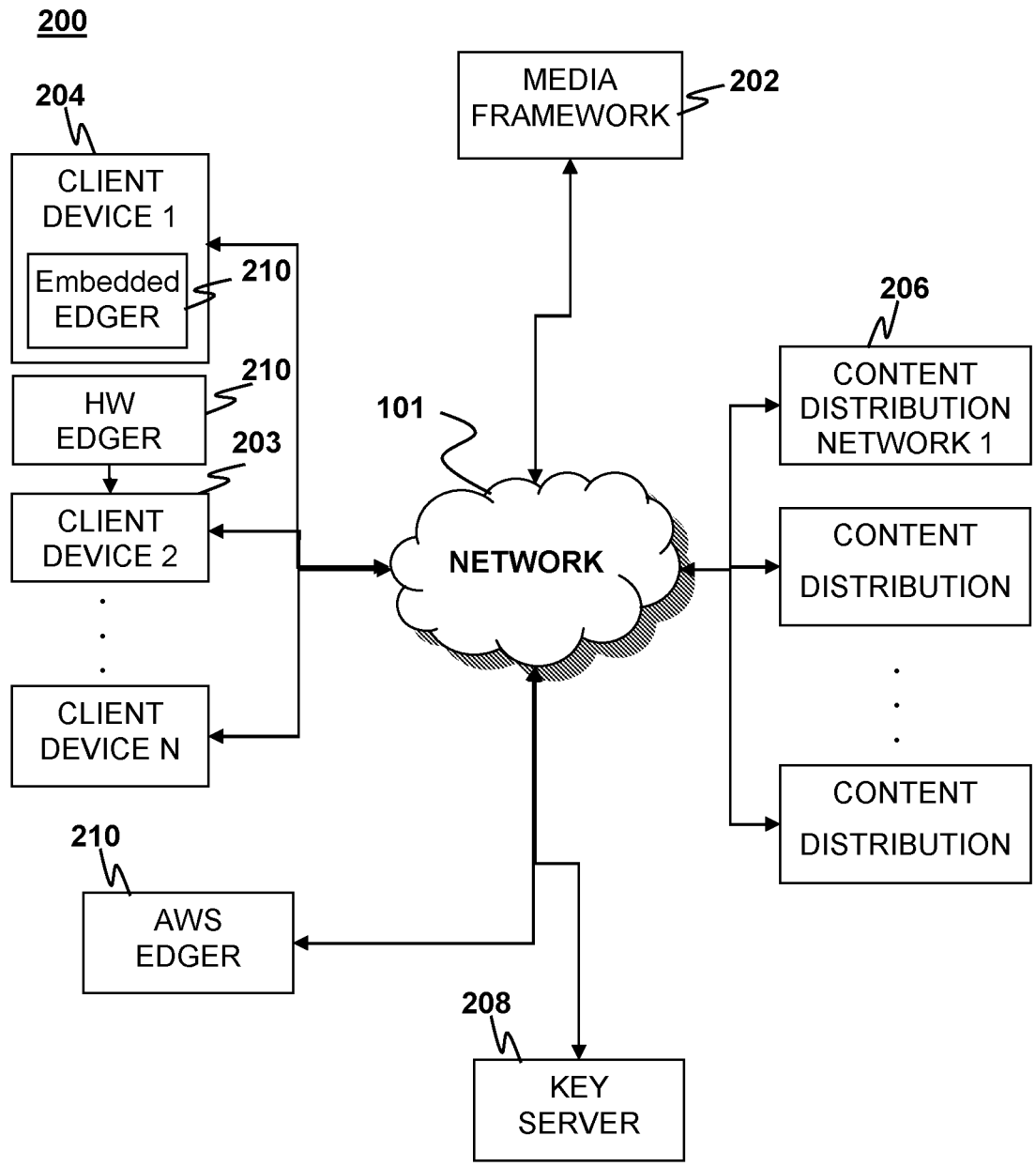
FIG. 2A depicts a HLS system enhanced with Reductive Edging according to aspects of the present disclosure.

FIG. 2A shows a HLS system enhanced with Reductive Edging. The user experience for HLS based streaming may be enhanced, e.g., with faster device startup time and reduced buffering times using a Reductive Edging device or embedded devices 210. In some implementations, 64% faster buffering times and 60% faster start up times may be achieved using reductive edging.

Reductive Edging may be performed by client devices 204 having embedded Reductive Edging devices 210 or by client devices 203 connected to a local Reductive Edging device 210 or by a client device in communication with the Reductive Edging device 210 over a network 101. Embedded Reductive Edging devices may be created within specialized circuitry of the client device or as a separate specialized module with specialized instructions, processor and memory coupled to the processor of the client device through for example a communication bus. In some implementations, Reductive Edging may be implemented as a software service on a device or its operating system (OS).

The network may be for example and without limitation, the internet, a Local Area Network (LAN) or some other type of Wide Area Network (WAN). The prefetching device may be in communication over a network 101 with the media framework 202, the key server 208, the CDN 206 or any combination thereof during operation. In some implementation, the prefetching device may communicate through the client device. For example, the media-prefetching device may use a network interface of the client device to communicate with servers over the network 101.

Figure 2B:
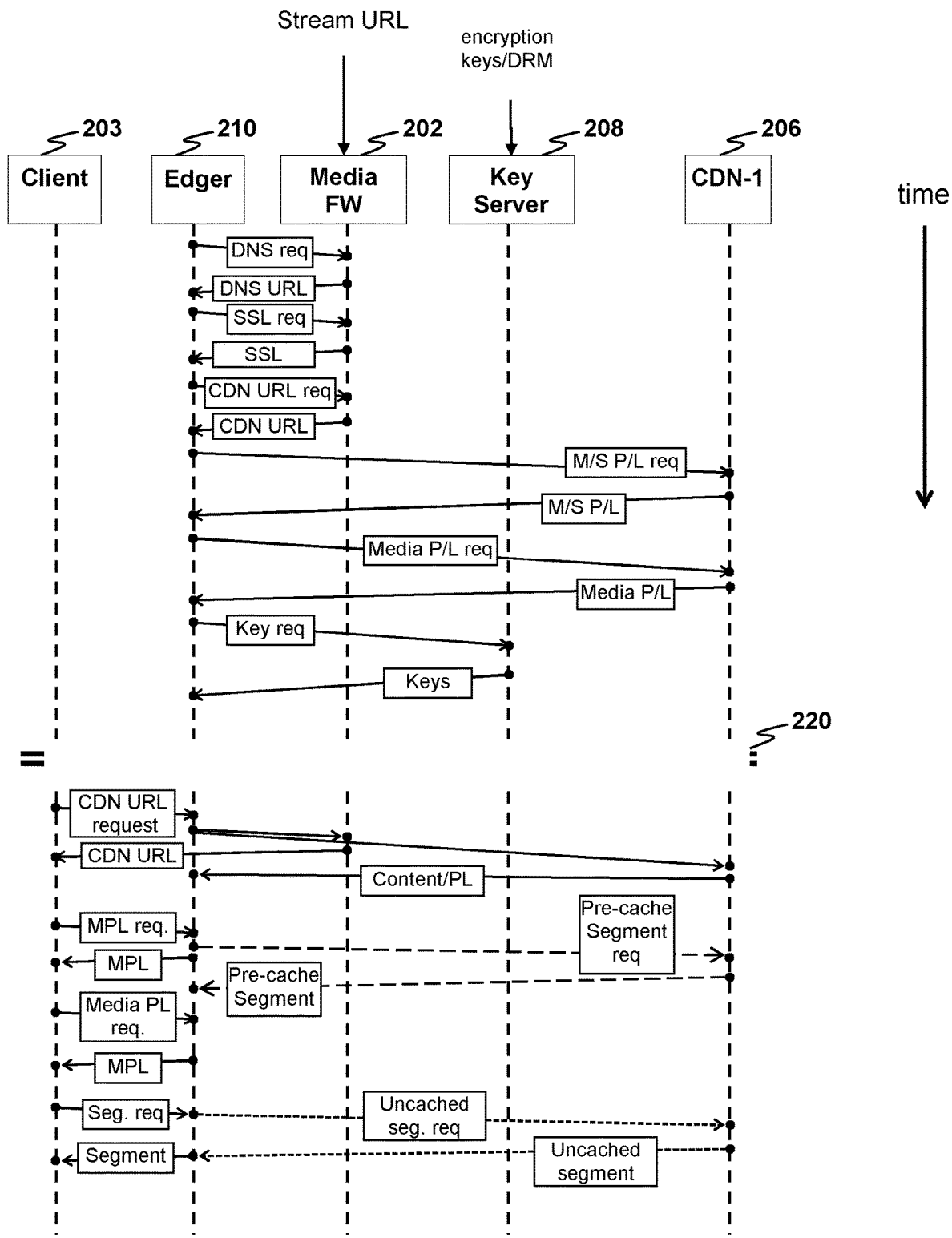
FIG. 2B is a flow diagram showing the method of operation of the Reductive Edging device in communication with a client device according to aspects of the present disclosure.

FIG. 2B depicts the method of operation of the Reductive Edging device in communication with a client device according to aspects of the present disclosure. The Media Prefetching device begins operation before the client device begins communication with the servers hosting HLS data as indicated by the double line 220. In some implementations, the client device may not be powered while the Reductive Edging performs the operation above the double line 220.

The Reductive Edging device 210 may begin operation by sending a request to the domain name system (DNS) for the location of the Media Framework Server 202. The DNS sends the location, typically in the form of an IP address, of the Media Framework Server back the to the Reductive Edging device 210, where it is received. In some implementations, the Reductive Edging device 210 may contact a trusted source and download a secure socket layer (SSL) certificate for encrypted communication. This trusted source may be part of the media framework 202. The SSL certificate is used during communication with SSL enabled servers to encrypt communication. This encryption ensures that communications made by the server to the client and vice versa, intercepted by third parties will be unintelligible.

The Reductive Edging device 210 may then send a request to the Media Framework 202 for the location of the CDN. The Media Framework 202 may return the location of the CDN to the Reductive Edging device 210. The CDN location is then stored and used for subsequent communications. The Reductive Edging device 210 sends a communication through the network to the CDN 206 requesting the Master Playlists. In response, the CDN 206 sends the Master Playlists through the network where it is received by the Reductive Edging device 210. The Reductive Edging device 210 then stores the Master Playlist.

As discussed above the Master Playlist contains a list of locations of a media presentation at different bitrates, in different formats or with alternate versions of the content. The number of different media presentations on the CDN 206 is finite. Therefore to accelerate the streaming process, in some implementations the Media Pre-fetcher may request a Master Playlist comprising every Media Presentation on the CDN 206. The Master Playlists are then stored in memory or mass storage. In some implementations, the Reductive Edging device 210 may predictively request Master Playlists to reduce download time and memory space required for the Master Playlists. For Example and without limitation the Reductive Edging device may track the user's viewing habits in a table so that the device has a record of what piece of content the user last viewed. The device may download the Master list for that content before the user request to view the content or even starts the client device. Similarly, for games the system may track games the user frequently plays and download a master list for if playtime or number of sessions for the game is above a certain threshold. Note that while this implementation is described in the context of games it may also be applied to other media types such as video or music.

Once the Master Playlist is received at the Reductive Edging Device 210, a request may be sent to the CDN 206 for Media Playlists by the Reductive Edging device 210. Similar to the Master Playlist, there are a finite number of Media presentations on the CDN 206. Therefore, the Reductive Edging device may request a media playlist for every media presentation on the CDN 206. The Reductive Edging device 210 may optionally implement predictive methods to reduce the number of content playlists downloaded. Predictive methods for prospective fetching of content lists are substantially similar to those described above with respect to the master playlist. Tracking of user activity for the Content Playlist is generally more granular than for the Master Playlist because the Content Playlist represents a particular media presentation whereas the Master Playlist represents a set of media presentations having, different bitrates, different formats or alternate versions of the content.

After the CDN 206 receives the request for Media Playlists, it sends the Media Playlists through the network to the Reductive Edging device 210. The Media Playlists are received by the Reductive Edging device 210 and stored either in memory or in mass storage.

The Reductive Edging device 210 may then request keys from the Key Server 208 for each media playlist received from the CDN 206. These keys are stored in memory or in mass storage after they are received by the Reductive Edging device 210 from the Key server 208.

Once the user initiates the streaming system on the client device 203, communication between the client device 203 and the Reductive Edging device 210 may begin. The client device may be configured to communicate with the Reductive Edging device as though it were part of the media framework and in the content delivery network. Thus, the Reductive Edging device 210 may receive a request for the CDN location from the client device 203. The Reductive Edging device 210 forwards the request to the Media Framework 202. The Media framework 202 replies with the CDN location, which is received by the client device 203. Concurrently the Reductive Edging device 210 sends a content playlist request to the CDN 206. The CDN 206 sends the content playlist and the content playlist is received by the Reductive Edging device 210.

After receipt of the CDN location, the client device 203 sends a request for a master playlist from the Reductive Edging device 210. The client device 203 may be configured to request Playlists from the Reductive Edging device 210 before contacting the CDN 206 or instead of the CDN 206. After receiving the request for a master playlist, the Reductive Edging device 210 may send the requested master playlist to the client device 203. The Reductive Edging device already has every master playlist in memory as the device has received all of the master playlists from the CDN earlier. In implementations, that predictively request master playlists the memory contains master playlists likely to be requested as such there is the possibility that the prediction was incorrect and in such a case the request will be forwarded to the CDN 206.

After receiving the master playlist request, the Reductive Edging device 210 may also send a request to the CDN 206 for media segments for prospective caching. In some implementations, the Reductive Edging device 210 may request media segments for every media playlist in the master playlist that was request by the client device 203. In other implementations, the Reductive Edging device 210 may track the most recently requested media playlist and may request media segments from the same media playlist or a congruent media playlist. By way of example and not by way of limitation the Reductive Edging device may keep a table of the five most recently requested media playlists, media segments downloaded etc. There may be some meta-information about each media playlist for example, the table entry may have information about the order in which media playlists are typically requested and information about the location next media playlist likely to be requested i.e. "Previous Watched: Breaking Bad Episode 1—Next episode: Breaking Bad Episode 2—Location of Next Episode: Location.Location." The Reductive Edging device may request media segments from media congruent with the meta-information, for example and without limitation the next episode in the series. In other implementations, the table may track user preferences such as Language, and connection speed and request media segments from the Master List that match those preferences.

The CDN 206 begins sending media segments to the Reductive Edging device 210 after the request for media segments is received. The Reductive Edging device 210 receives and stores the media segments from the CDN 206. The media segments may be stored in memory, for example in a buffer or in Mass Storage.

The Client device 203 may request a media playlist from the Reductive Edging device 210. In response the Reductive Edging device 210 may send the media playlist to the Client device 203. The Reductive Edging device 210 already has all of the media playlists for the requested master playlist in memory and therefore only needs to retrieve the requested media playlist from memory.

Next, the client device 203 may request a media segment from the Reductive Edging device 210. When the Reductive Edging device 210 received a request for a media segment, it may query its memory or mass storage for the media segment. If the media segment is found, the Reductive Edging device sends the segment to the client device 203. If the media segment is not found a request for the media segment is sent to the CDN 206. Upon receiving the request for a media segment, the CDN sends the requested media segment to the Reductive Edging device 210. The Reductive Edging device 210 stores the media segment in memory or mass storage after receiving the media segment. The newly stored media segment may then be sent to the client device 203. As discussed above the media segment may be encrypted as part of the DRM protection, therefore as part of the storage process the Reductive Edging device 210 decrypts the media segments with the correct key received from the key server. In other implementations, the media segments may be decrypted before being sent to the client device. Once media segments are being sent from the CDN 206 and received at the Reductive Edging device 210 the Reductive Edging device 206, may store media segments ahead of the client device 203 and send them to the client 203 device as necessary.

Error De-Emphasis in Reductive Edging

Error de-emphasis refers herein to operations performed by the reductive edging system that either reduce the appearance of streaming errors to the client device or provide immediate error feedback to the client device and thereby reduce the time cost to the user due to the error state. Examples of error de-emphasis within the context of the present disclosure include, but are not limited to Error Shielding, Discontinuity Handling, Enhanced Protocol Usage, addressing problematic latency, addressing network disruption, and Reductive Edger Managed Bit Rate Control.

Error Shielding

Figure 3:
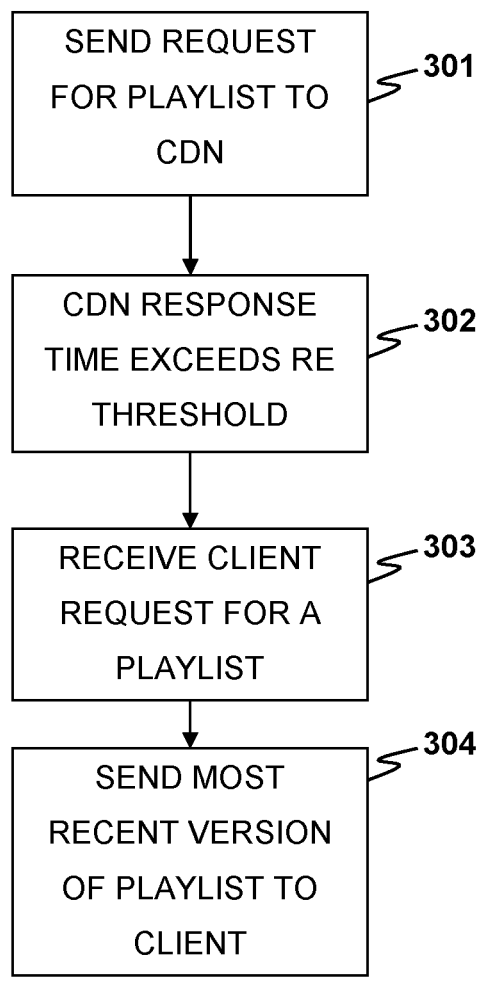
FIG. 3 depicts a flow diagram of a method for cached playlist error de-emphasis according to aspects of the present disclosure.

According to aspects of the present disclosure the Reductive Edging device may implement error de-emphasis by masking high latency in playlist reception. As shown in FIG. 3 the Reductive Edger may send have cached versions of a playlists (either master playlists, media playlists, content playlist or any combination thereof) held in memory and received as a result of previous or earlier playlist requests. Before the client device makes a request for a playlist the Reductive Edging device may send a request for the playlist to the CDN 301. The Reductive Edging device may wait a threshold amount of time for a response from the CDN. If the response time for the CDN exceeds the threshold, 302 then in response to a client request for the playlist 303 the Reductive Edging device may send whatever playlist is in cache. If the cache entry is stale, the client may refresh by reissuing a playlist request at a heighted pace, assuming it is capable of doing so. If not, some implementations may include an option for the client device to wait, although this may not be a very good choice in some cases. For example, a wait usually cause a playback breakdown especially with an incompetent HLS client. In alternative implementations the Reductive Edging device may send the most recent version of the playlist cached in memory 304.

As described above, the Reductive Edging device 210 does not need to hold a response. In some implementations, the Reductive Edging device 210 may be configured to always respond with what is in the cache even if it is not the latest. If the immediate cache response is new, then the Reductive Edging device 210 may quickly respond with new content for the client to process. If the response is stale (e.g., the same playlist), the client 203 (e.g., an HLS client) may be designed to re-issue the playlist request at hastened pace. This is a useful implementation, where, e.g., the CDN response delay would otherwise detrimentally affect the HLS playback experience. For example, in some situations, any wait delay in responding to a client's request is often interpreted to be the result of a slower network condition and a client may erroneously switch bit rate, which takes even longer and results in the client 203 receiving lower quality content. In such cases, the Reductive Edging device 210 can relieve the client's responsibility in handling response latency by responding immediately to the playlist request from the client 203. In some implementations, If the client is going to wait a certain amount of time to timeout, the Reductive Edging device 210 can instead timeout sooner and issue an error message (e.g., a 404 (not found) error) causing a bitrate switch on the client instead of rebuffering for long periods of time. By way of example and not by way of limitation the Reductive Edging device may have a response threshold of, e.g., 1000 ms, which may be significantly less than the time a client device would wait before timing out. In such a case, the Reductive Edging device 210 may send a request for a playlist to the CDN and wait 1000 ms for a response. There may be network conditions such as a broken network connection or network congestion that cause the CDN high latency or a failure to respond to the request for the playlist. If the Reductive Edging device does not receive a response within the 1000 ms threshold, the device may send out a cached copy of the playlist to client devices in response to subsequent requests for a playlist. The cached copy may have been received in response to a previous request sent to the CDN. In this way, the Reductive Edger may reduce the appearance of streaming errors to users because the user will not have to wait for the client device's longer threshold time and a failure to receive a playlist will not immediately affect the user experience.

Figure 4A:
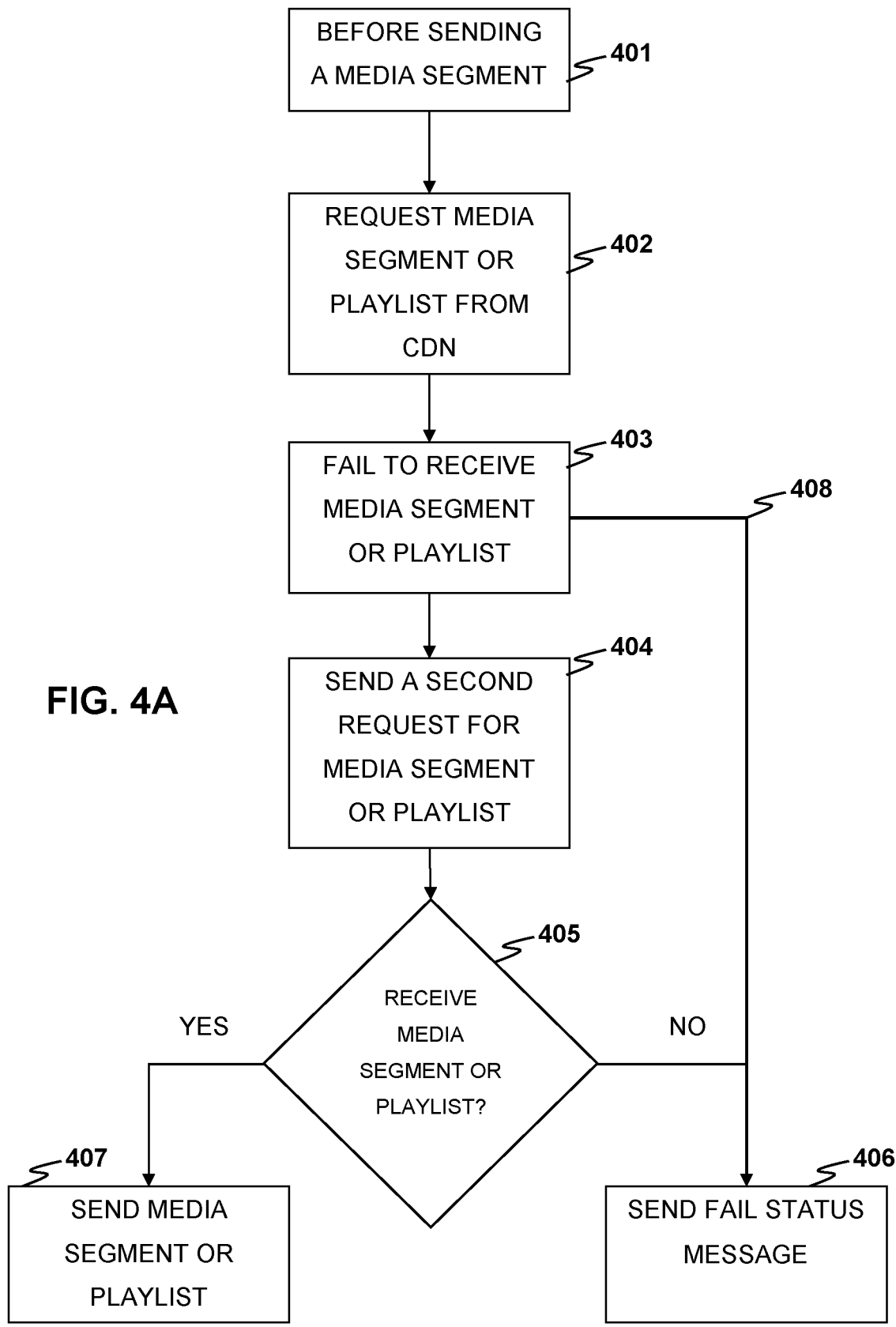
FIG. 4A shows a flow diagram of a method for playlist or media segment error de-emphasis according to aspects of the present disclosure.

According to another aspect of the present disclosure, error de-emphasis may provide immediate feedback for a failure during streaming or may hide a failure to download a media segment or playlist by requesting the playlist or media segment a second or subsequent time. FIG. 4A is a flow diagram showing the method for performing error de-emphasis with regards to failure to receive a playlist or media segment from a CDN. As discussed above the reductive edging system procures playlists and may even acquire media segments before a request is received from the client device for the media segment or playlist 401. The Reductive Edging device may send a first request to the CDN for a playlist or media segment 402. The Reductive Edging device may fail to receive a playlist or media segment from the CDN 403. This failure may be the result of network congestion, broken connection lines or other conditions that increase latency and packet loss in network communication. The Reductive edging device may be notified of the over the network or initiate a failure mode as a result of the wait time to receive the request playlist or media segment exceeding a threshold or a failure of an integrity check of the media segment or playlist. An integrity check may for example and without limitation may be an operation that generates a hash of the media segment or playlist and checks the generated hash to a known hash for the media segment or playlist.

There are a number of ways in which the Reductive Edging device may be notified of a failure. For example, if the Reductive Edging device is edging the CDN 403.

Failures usually come from the CDN. Some failures are in form of direct responses from CDN 403; other failures are inferred from CDN's slowness, irresponsiveness, or corruption in content delivery.

In some implementations, the reductive edger may immediately proceed to a fail state 408 and notify send a fail status message notifying the user of the failure 406. In this way, the user is immediately notified that a media segment or playlist is unavailable and therefore the user is saved time and frustration, as they will not select unavailable playlists or media. In another implementation, retry logic used whereupon after the first failure mode 403 the Reductive Edging device sends a second or subsequent request for the media segment or playlist 404. It should be noted that the current disclosure is not limited to a second request and the device may request the media segment or playlist a third, fourth, fifth or any number of times. After the second or subsequent request, the device determines whether it receives the requested media segment or playlist 405. for Example and without limitation the Reductive edging device may be notified of the over the network or initiate a failure mode as a result of the wait time to receive the request playlist or media segment exceeding a threshold or a failure of an integrity check of the media segment or playlist. If the device fails to receive the requested media segment or playlist then it will send a failure status message to the client device 406. If the device receives the requested media segment or playlist then the device will send the media segment or playlist to the client in the normal fashion as described above with respect to FIG. 3. In this way, the error de-emphasis improves the user experience by resuming from a failure mode without the user being notified of the failure, thus creating a smooth viewing experience. It should be noted that the failure status message may be any message sent to the client device notifying it of a failure to receive a media segment or playlist.

In certain implementations, the Reductive Edging device takes over the ABR responsibility completely. In such cases, a client just plays a single variant playlist. If there is any problem obtaining a segment, the Reductive Edging device could try different variant in a way that is transparent to the client. In other words, if the playlist is playable, a client would not see any of the errors. In the case of an unplayable playlist, the client would receive an appropriate error message immediately from the Reductive Edging device and would not waste time attempting to recover when no recovery option is offered. Such fast resolution in a fatal condition is a desirable result.

Figure 4B:
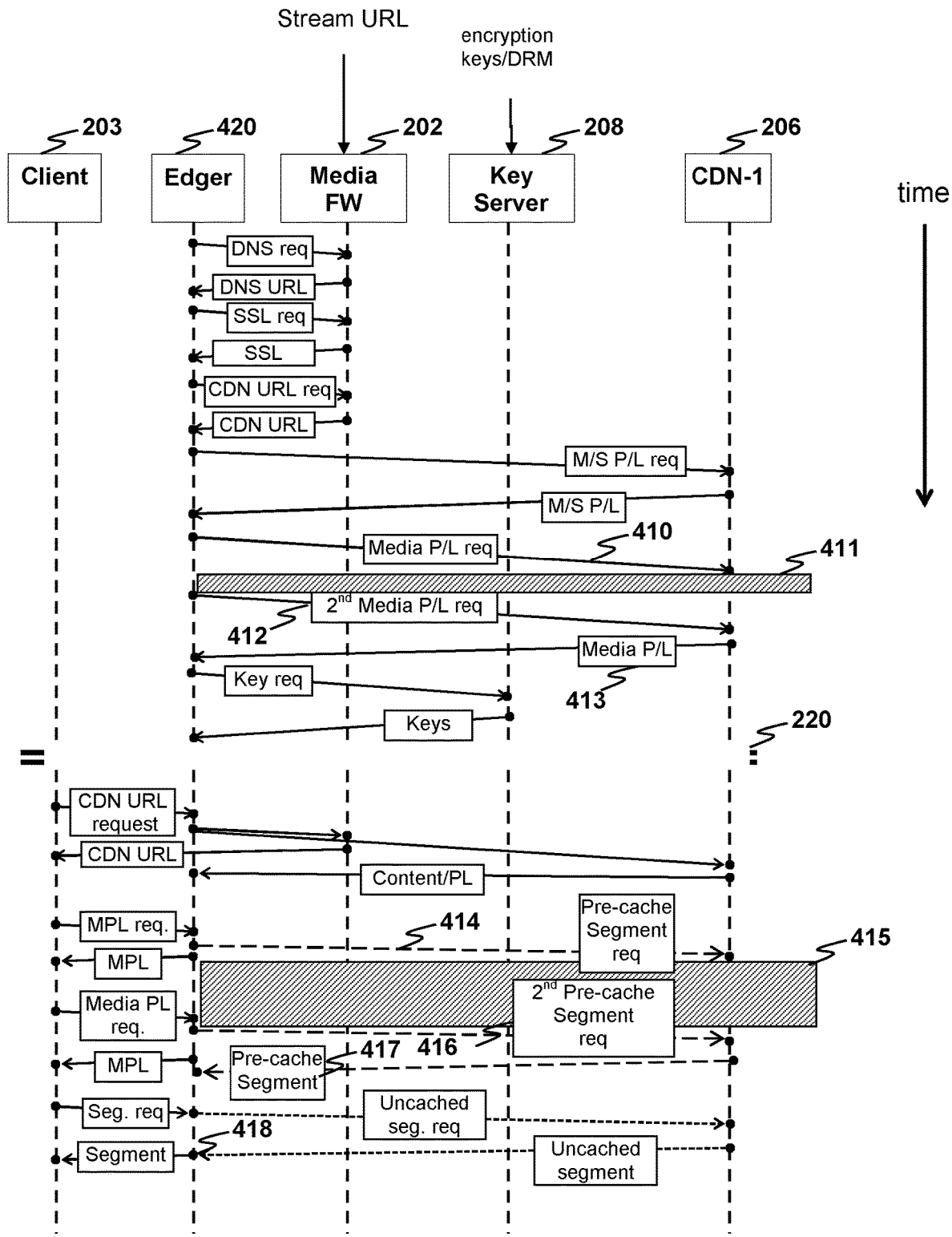
FIG. 4B is a flow diagram depicting a method of operation for playlist or media segment request retry error de-emphasis according to aspects of the present disclosure.

FIG. 4B depicts a method of operation for performing error de-emphasis in a situation involving failure to receive a playlist or media segment from a CDN. As shown, before the client device 203 sends a request to the Reductive Edging device 420, the Reductive Edging device is active. The Reductive Edging device may pre-emptively begin requesting playlists for later delivery to the client device. In the depicted example, Reductive Edging device 420 sends a media playlist request 410 to the CDN 206. The Reductive Edging device then waits a threshold period 411. If the Reductive Edging device 420 does not receive the media playlist within the threshold period, in this example, the Reductive Edging device sends a second media playlist request 412 to the CDN 206. The CDN 206 may send a media playlist in response 413 to the second media playlist request. In this case the CDN may have failed to receive the first media playlist request, the first media playlist was lost or some other error occurred that prevented the Reductive Edging device from receiving the media playlist. It should be noted that though the depicted example shows operation with respect to a media playlist, the disclosure is not so limited and the example depicted in FIG. 4B may be used for master playlists, content playlist or any other media list used in the operation of live streaming.

Additionally shown is resumption from a failure to receive a media segment in response to a media segment request. The Reductive Edging device 420 may send a media segment request 414 to the CDN 206. If the media segment is not received after a threshold period 415 the Reductive Edging device 420 may send a second media segment request 416. After the Media segment request is received by the CDN. The CDN may send the media segment 417. It should be noted that this operation takes place before the client device 203 requests a media segment and therefore the client device is shielded from the effects a failure to receive the media segment. The client device may receive the media segment 418 from the Reductive Edging device 420 much later with minimal delay between when the request for the media segment is sent to Reductive Edging device and when the media segment is delivered to the client.

Figure 4C:
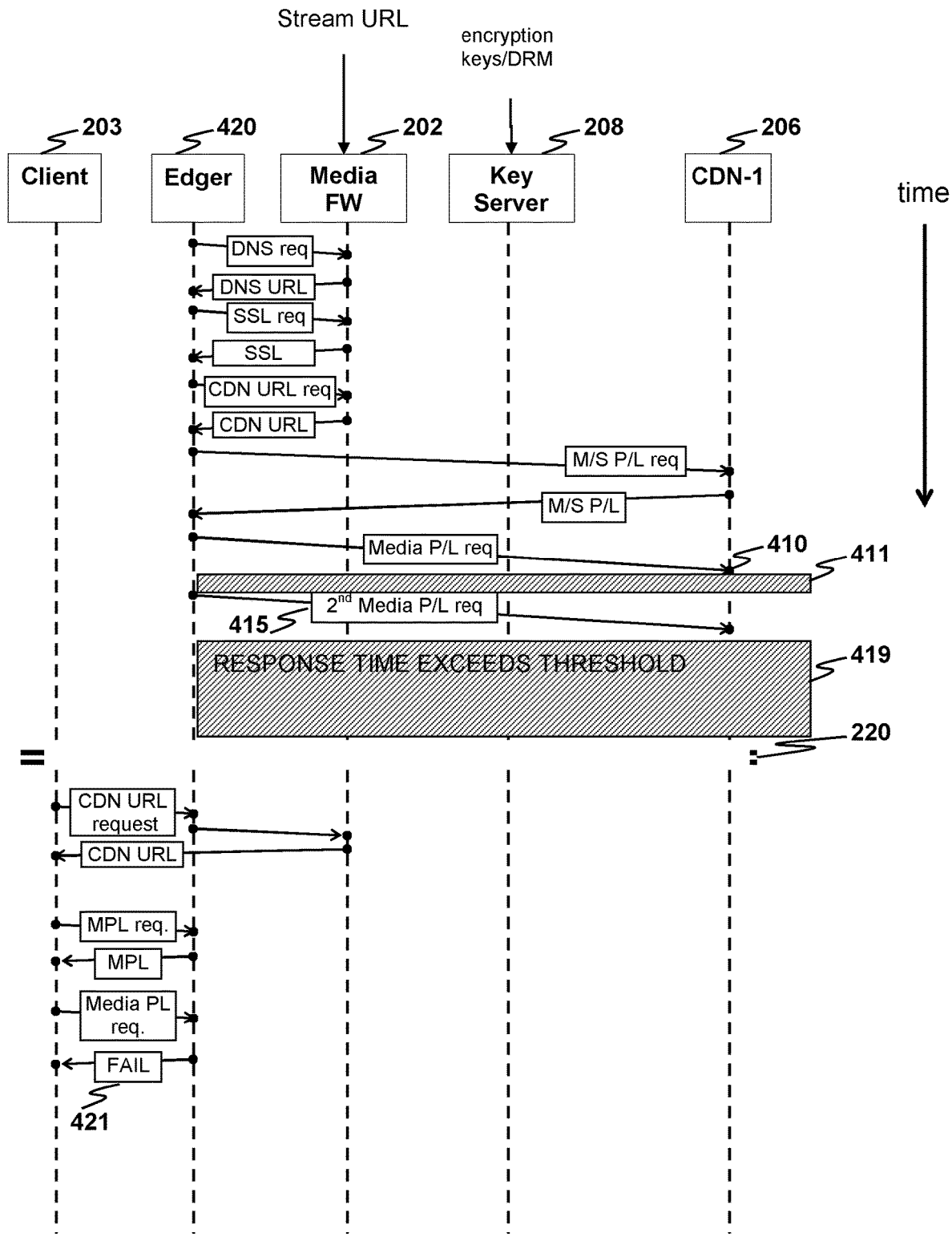
FIG. 4C is a flow diagram depicting a method of operation for playlist or media segment request retry failure error de-emphasis according to aspects of the present disclosure.

FIG. 4C depicts a timing diagram for the method for performing error de-emphasis in a situation involving failure to receive a playlist or media segment from a CDN after a second request. As discussed above the Reductive Edging device 420 may send a request for a media playlist 411 to the CDN 206. If the CDN 206 does not respond with the media playlist in the threshold period 412 the Reductive Edging device 420 sends a second request for the media playlist 413. In this implementation if the Reductive Edging device does not receive the media playlist after a second threshold period 419 the reductive edger enters a fail state and ends operation for that media playlist. The Reductive Edging device may then respond to any request by the client device for the media playlist with a failure status message 421. This ensures that the failure to receive the media playlist from the CDN is immediately apparent and the user can take remedial steps to improve their experience such as trying to watch a different piece of media. It should be noted that, though the depicted example shows a single retry operation the current disclosure is not so limited. In some embodiments there may be two, three, four or any number, such as a user defined number, of retry operations before a failure mode is reached. In other embodiments, the reductive edger does not retry to send the request for a playlist or media segment to the CDN and instead simply goes straight to the failure mode.

Discontinuity Handling

Figure 5A:
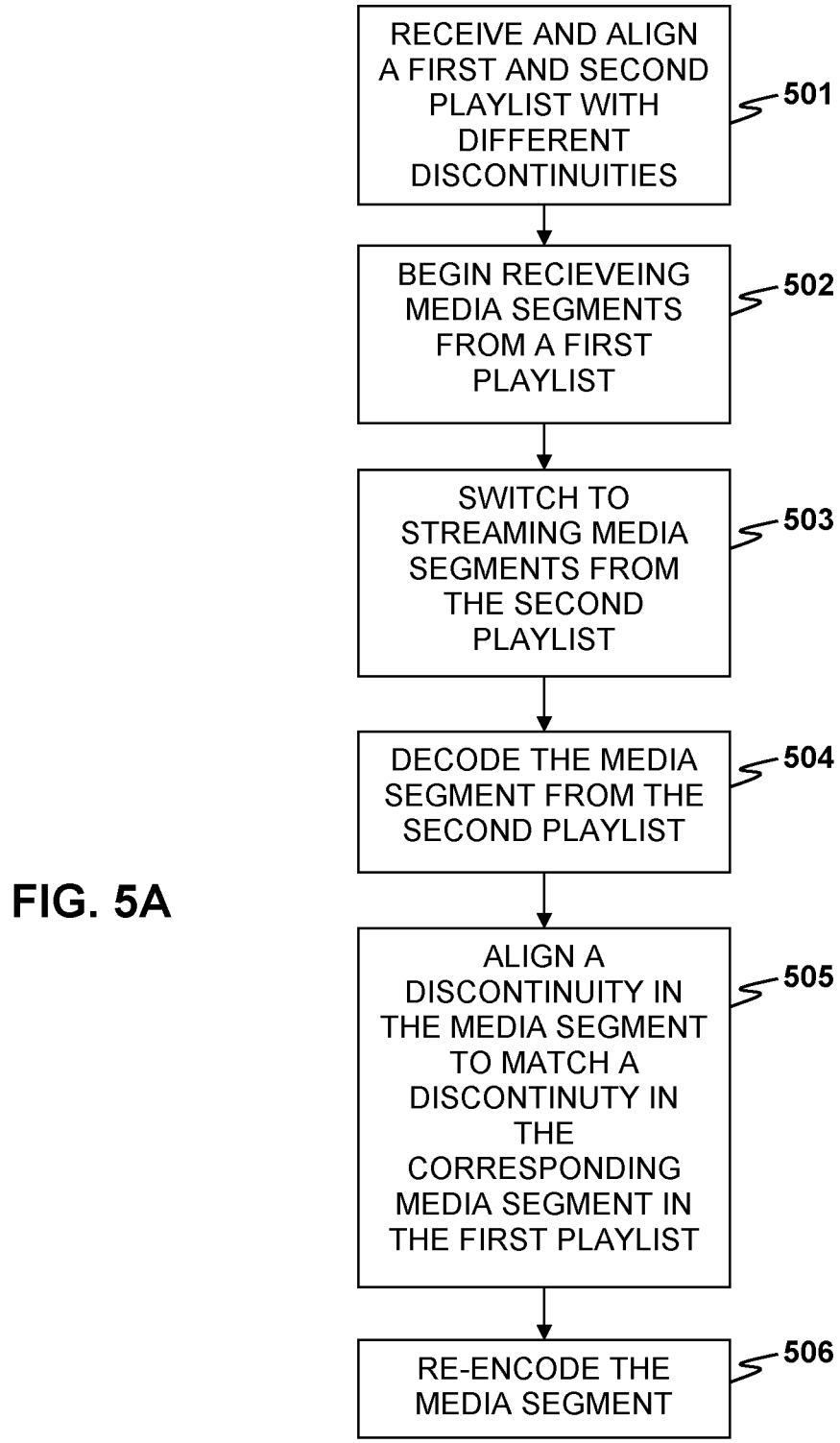
FIG. 5A depicts a flow diagram for a method of Reductive Edging device management of discontinuities in the media according to aspects of the present disclosure.

FIG. 5A is a flow diagram depicting error de-emphasis with respect to discontinuities in playlists. A discontinuity in a media playlist informs the client device that the video being played is no longer contiguous. Discontinuities occur, e.g., when advertisements are inserted into video content. Advertisements are often encoded completely differently than the rest of the content in the media playlist. Other types of discontinuities include time discontinuities, content discontinuities, and encoding discontinuities. An ad injection is an example of a time discontinuity—usually from ad injection. A content discontinuity is similar to a time discontinuity but often the result of missing or unavailable content. In an encoding discontinuity, a significant encoding parameter changes.

A discontinuity notifies the media player that an ad is about to occur. Generally speaking, a media player does not understand the concept of an 'ad'. To the media player, all the content it receives is video content. A discontinuity signifies a significant time or encoding changes and the player decides what if anything needs to be done. This is player implementation dependent. Some players will flush the decoder, some adjust timestamp alignment, and some do nothing. Discontinuities must be aligned across playlists otherwise the media player will incur an error due the playlist not conforming to the protocol. Additionally due to media segments being encoded by multiple different encoders during the streaming process, the discontinuities between playlists may be in different places or there may be a different number of discontinuities in each playlist. As such one aspect of the error de-emphasis implemented in the present disclosure involves aligning discontinuities between playlists with the Reductive Edging device so that the client device does not have to handle mismatched discontinuities between playlists. Misaligned discontinuities across playlist variants may technically violate the specification (spec) of a streaming protocol, such as the HLS spec but in reality in can happen. Expecting all HLS clients to handle this correctly is unrealistic. Resolving issues like this in the edge is highly desirable.

In an embodiment of the present disclosure the Reductive Edging device may receive playlist from the CDN with discontinuities that are misaligned (i.e. at different time stamps). The Reductive Edging device may reorganize the discontinuities in the playlists so that they are aligned 501. This may be done by, for example and without limitation, by changing the timestamps and order of media segment entries and discontinuity entries for one or more of the playlists. The aligned playlists may then be sent to the client device. After a choice has been made for the media segments that the client device will receive the Reductive Edging device requests and will begin to receive media segments from the desired playlist 502. These media segments may then be sent to the client device either immediately or after being cached. During streaming, media segments from the Reductive Edging device to the client device a decision may be made to switch from a first playlist to a second playlist 503. For example and without limitation, the client device or the Reductive Edging device may choose to change from a high bit rate playlist to a lower bit rate playlist due to network congestion. The Reductive Edging device may then begin receiving media segments from the second playlist and aligning the discontinuities in the second playlist to match the discontinuities in the first playlist. This alignment is achieved by decoding the media segments in the second playlist 504 and shifting where breaks and discontinuities in the media segments begin and end such that they match the first playlist 505 and then then re-encoding the media segments 506 in such a way that the breaks and discontinuities are maintained. There many ways to resolve this as long as the discontinuities is aligned. For example, the equivalent segment from a different variant can be fetched. Remember that the client in a Reductive Edging environment only sees one variant. As long as a segment is fed, the presence of a discontinuity is not very relevant to the client.

In some embodiments, the client device may be capable of handling some misalignment in the discontinuities but not others. In this case, the Reductive Edging device may format the discontinuities in the playlist and of the media segments to match the form that is compatible with the client device. In some other embodiments the client device may not be able to handle discontinuities at all, in which case the Reductive Edging device may remove the discontinuities from the media segments before they reach client device.

Figure 5B:
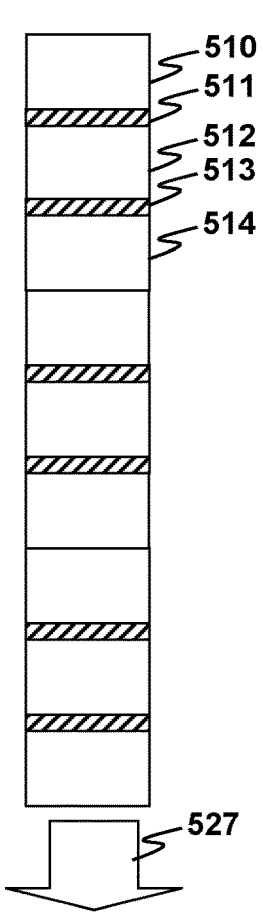
FIG. 5B shows Reductive Edging device aligned discontinuities according to aspects of the present disclosure.
Figure 5B:
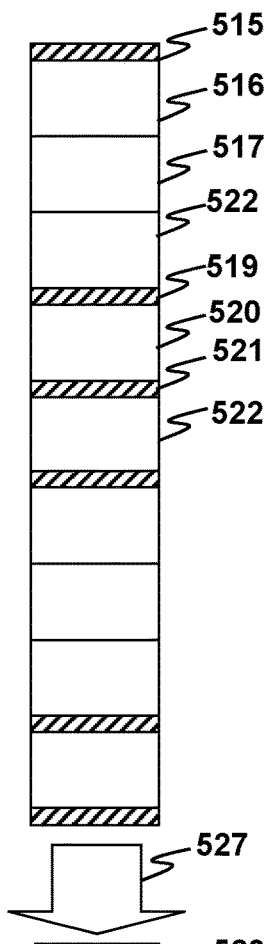

FIG. 5B illustrates an example of alignment of discontinuities according to aspects of the present disclosure. As shown, media playlist 1 has media segments 510, 512 and 514 with discontinuities 511 and 513. Media playlist 2, by contrast, has media segments 516, 517, 518, 520 and 522 with discontinuities 515, 519 and 522. Due to the illustrated discontinuity arrangement, although both playlists have the same number of media segments and discontinuities the time at which each corresponding segment is played differs between the two playlists. An alignment 527 changes the position of discontinuities so that the playtime for segments 523, 525, 527 in media playlist 1 and 2 match and the playtimes of the discontinuities 524, 526 match.

While the example depicted in FIG. 5B involves a repeating pattern of discontinuities, this disclosure is not so limited and includes playlists that may have discontinuities randomly distributed throughout the playlists as well as any other organization pattern. Additionally though the example depicts playlist 2 being aligned to playlist 1 this disclosure is not that limited and may comprise aligning playlist 1 to playlist 2 or aligning discontinuities and breaks in the media segments of both playlists to a new order. Finally though the alignment action was described with respect to two playlists the disclosure is not so limited, the heretofore described alignment method may be used to with respect to 3, 4, 5 or any number of media playlists and media segments.

Enhanced Protocol Usage\

According to additional aspects of the present disclosure, the Reductive Edging device may be configured to handle enhanced streaming protocols. Here, enhanced streaming protocols refer to protocols that are later iterations of previous protocols or more recently developed protocols than, e.g., HTTP livestreaming protocols. Some examples of enhanced streaming protocols are Hypertext Transfer Protocol version 2 (HTTP/2) and WebRTC. In some cases, the client device may not be configured to handle enhanced streaming protocols. In this case, the Reductive Edging device may convert the media streams or other files accessed using the enhanced streaming protocols to a format that is compatible with the client device. For example and without limitation the Reductive Edging device may create a playlist for WebRTC streams and chop the WebRTC streams up to create media segments. The Reductive Edger may send converted WebRTC streams to the client device. This is a true advantage of reductive edging—reaping advance technology that is otherwise unavailable to the HLS clients. Such advantages have the benefit of "de-emphasizing" errors that would otherwise affect the client in a way that would interfere with the user experience.

Reductive Edger Managed Bit Rate Control

Adaptive bit rate control (ABR) may be implemented on the reductive edging device to eliminate the need for ABR on the client device. Currently, ABR implementations in streaming devices vary wildly among manufacturers. This can affect the user experience from the point of view of the CDN. To eliminate these variances an aspect of the present disclosure moves ABR from the client to the Reductive Edging device. ABR is a core component of most current HTTP streaming applications but is often made to be generic and does not necessarily perform well for live video streaming situations. As such, the Reductive Edging device may be configured to remove ABR decisions from the client device by supplying the client device with a content playlist at single bit rate. The client device may be provided this single bit rate playlist in a media playlist. Thus, the client device will act as though there is only a single bit rate playlist available while the Reductive Edging device conducts ABR procedures to control the bit rate of the media segments sent to the client device. Shifting ABR responsibility to the Reductive Edging device can greatly deemphasize errors common in streaming applications. For example, ABR is usually the core HLS playback component and is also the most common source of problems—ABR efficiencies, CDN edging, error handling, etc. Aspects of the present disclosure do necessarily involve introducing a new ABR algorithm. Instead, aspects of the present disclosure involve a new architecture regarding where ABR is hosted especially in the presence of cross-platform players for streaming data.

The Reductive Edging device may implement an advanced form of ABR using a forward network prediction algorithm such as Moving Averages Convergence Divergence (MACD) Algorithm. Typical ABR algorithms use weighted averages on bandwidth samples observed in the past. The number of samples may differ among strategies. Most of these strategies are "laggards" in their approach. With exponential moving averages or weighted moving averages, it takes time for the ABR to respond to drastic changes in bitrate. Furthermore, there is no mechanism to predict and proactively adapt to changing network conditions.

Implementation of ABR using a MACD algorithm prevents a long lag time in bit-rate control by proactively anticipating underlying trends in system and network conditions. MACD takes the difference between two exponential filters where each exponential filter has a different time constant ($\tau$) with one time constant being shorter than the other ($\tau_1 < \tau_2$). Typically, the exponential filter takes the average of all the data points within the period of the time constant ($A_{\tau 1}$) and ($A_{\tau 2}$):

$$\frac{\sum_{n=m}^{\tau} d_n}{\tau}$$

Where d represents a data point and m is the first time point in the series. An exponential filter is then applied for each data value after $\tau_1$ and $\tau_2$ respectively:

$$\left(d_{\tau_1+n}\left(\frac{2}{\tau_1+1}\right) + A_{\tau_2+(n-1)}\left(1 - \frac{2}{\tau_1+1}\right)\right) \text{ and}$$

$$\left(d_{\tau_2+n}\left(\frac{2}{\tau_2+1}\right) + A_{\tau_2+(n-1)}\left(1 - \frac{2}{\tau_2+1}\right)\right)$$

The value of the two exponential filters $\tau_{\tau 1+n}$ and $A_{\tau 2+n}$ is then subtracted $A_{\tau 1+n} - A_{\tau 2+n}$ to produce the MACD for a value of $\tau_2$+n. Here $A_{\tau 1+(n-1)}$ and $A_{\tau 2+(n-1)}$ represent the value of the exponential filter from the previous time point for time constants $\tau_1$ and $\tau_2$ respectively. Essentially this creates a sliding window with $\tau_1$ and $\tau_2$ being the lengths of each sliding window. It should be noted that at $\tau_2$ the MACD is calculated with $A_{\tau 1+n} - A_{\tau 2}$. Typically, the MACD is calculated with time constants at 12 and 26 days but embodiments of the present disclosure are not so limited and may be used for any value of the time constant >0. The MACD calculation also includes an estimation of the rate of change called the signal. The signal is the average of the MACD over a particular time period. From the MACD and signal calculation, information about immediate trends and long-term trends may be determined. For more information regarding the MACD and the signal see Stanley, Greg, "The 'MACD Approach' to Derivative (Rate of Change) Estimation" available at: http://gregstanleyandassociates.com/whitepapers/FaultDiagnosis/Filtering/MACD-approach/macd-approach.htm (2017) which is incorporated herein by reference.

The reductive edging device may compare values of the MACD to a threshold to determine when network congestion levels or other problems may be imminent. The reductive edging device may also monitor for when the MACD crosses over the signal line and use such a crossover to predict network congestion levels or other problems. For example and without limitation MACD may be applied ping response times. When the MACD for ping response crosses the threshold of zero from negative to positive, the reductive edger may switch to a lower bit-rate stream. Similarly, if the MACD crosses the signal line from below to above the reductive edger may switch to a lower bit rate stream. Conversely if the MACD crosses the threshold from positive to negative or crosses the signal line from above to below the reductive edging device may switch to a higher quality bit-rate.

Information associated with error de-emphasis herein may be interpreted as second or subsequent requests for media segments or playlists sent to a CDN, or Failure status messages sent to a client device, or media segments formatted to be compatible with a client device, or playlists that are optimized for adaptive bit-rate control implemented on the reductive edging device.

Standalone Reductive Edging System

Figure 6:
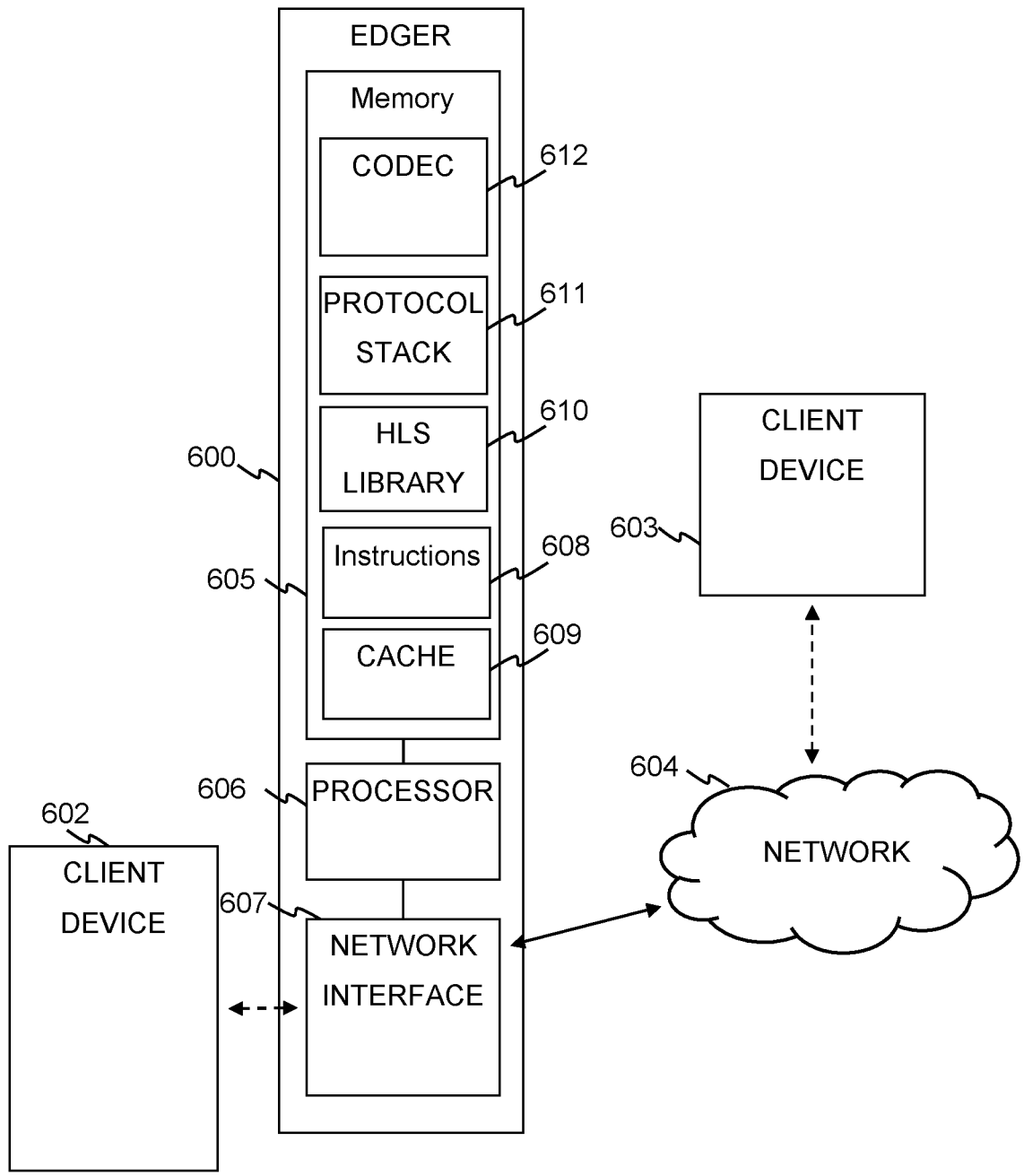
FIG. 6 depicts a standalone Reductive Edging device according to aspects of the present disclosure.

FIG. 6 depicts an example of a standalone Reductive Edging device according to aspects of the present disclosure. The standalone Reductive Edging device or Edger 600 may be coupled to a local client device 602 through a network interface 607 over a LAN or WAN. In other alternative implementation the standalone Reductive Edging device may be in communication through the network interface 607 with a non-local device 603 e.g., servers or another client, through a large network 604 such as the internet. In some implementations the client device is connected to the stand alone Reductive Edging device through a communication bus (not shown) such as, without limitation, a peripheral interconnect (PCI) bus, PCI express bus, Universal Serial Bus (USB), Ethernet port, Fire-wire connector or similar interface.

The standalone Reductive Edging device 600 may include one or more processor units 606, which may be configured according to well-known architectures, such as, e.g., single-core, dual-core, quad-core, multi-core, processor-coprocessor, cell processor, and the like. The standalone Reductive Edging device 600 may also include one or more memory units 605 (e.g., random access memory (RAM), dynamic random access memory (DRAM), read-only memory (ROM), and the like).

The processor unit 606 may execute one or more instructions 608, portions of which may be stored in the memory 605 and the processor 606 may be operatively coupled to the memory through a bus or bus type connection. The instructions 608 may be configured to implement the method for prefetching in a HLS systems shown in FIG. 2B and the Error De-emphasis methods described in FIGS. 3-5B. Additionally the Memory 605 may contain instructions for storing Playlists in a HLS Library and a Protocol Stack defining HLS server locations. The Memory 605 may also contain the HLS Library 610 and the Protocol Stack 611. The Memory may further have a coder/decoder (CODEC) 612 configured for use with the media segments. The instructions 608 may further implement storage of media segments and playlists in a cache 609 during operation. The Instructions may implement alignment of playlists and decoding and encoding media segments as described in FIG. 5A. The Cache 609 may also be located in memory 605.

The standalone Reductive Edging device 600 may include a network interface 607 to facilitate communication via an electronic communications network 604. The network interface 607 may be configured to implement wired or wireless communication over local area networks and wide area networks such as the Internet. The device 600 may send and receive data and/or requests for files via one or more message packets over the network 604. Message packets sent over the network 604 may temporarily be stored in a cache 609 in memory 605. The client device 602 may connect through the network interface 607 to the electronic communications network 604. Alternatively, the client device 603 may be in communication with the standalone Reductive Edging device 600 over the electronic communication network 604.

Embedded Reductive Edging System

Figure 7:
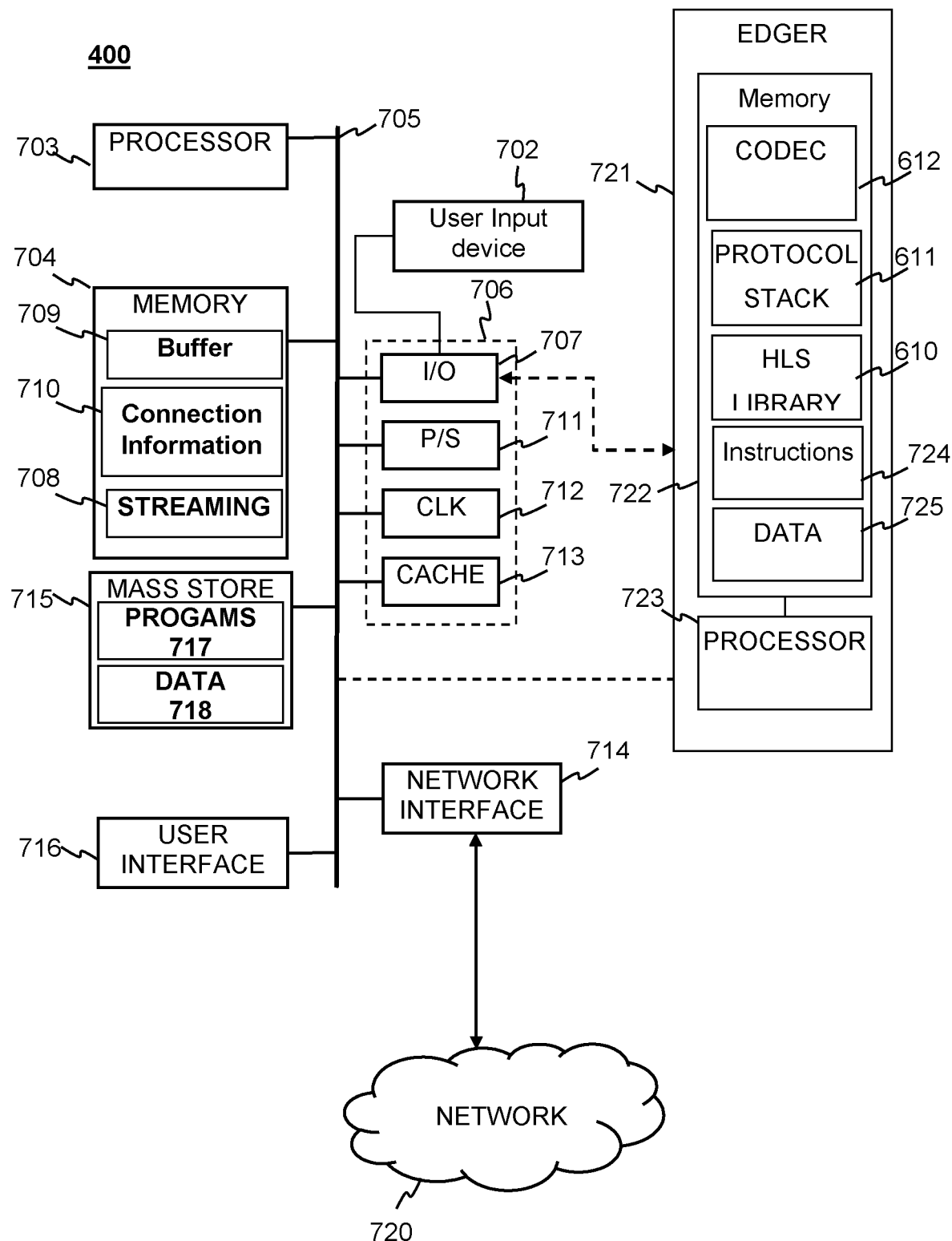
FIG. 7 shows an embedded Reductive Edging system according to aspects of the present disclosure.

FIG. 7 depicts an embedded Reductive Edging system according to aspects of the present disclosure. The embedded Reductive Edging system may include a client computing device 700 coupled to a user input device 702. The user input device 702 may be a controller, touch screen, microphone, keyboard, mouse, joystick or other device that allows the user to input information including sound data in to the system.

The client device of the embedded Reductive Edging system 700 may include one or more processor units 703, which may be configured according to well-known architectures, such as, e.g., single-core, dual-core, quad-core, multi-core, processor-coprocessor, cell processor, and the like. The computing device may also include one or more memory units 704 (e.g., random access memory (RAM), dynamic random access memory (DRAM), read-only memory (ROM), and the like).

The processor unit 703 may execute one or more programs, portions of which may be stored in the memory 704 and the processor 703 may be operatively coupled to the memory, e.g., by accessing the memory via a data bus 705. The programs may be configured to implement streaming media through HLS systems 708. Additionally the Memory 704 may contain information about connections between the system and one or more streaming servers 710. The Memory 704 may also contain a buffer of media segments 709. The Media segments and connection information may also be stored as data 718 in the Mass Store 718.

The computing device 700 may also include well-known support circuits, such as input/output (I/O) components 707, power supplies (P/S) 711, a clock (CLK) 712, and cache 713, which may communicate with other components of the system, e.g., via the bus 705. The computing device may include a network interface 714. The processor unit 703 and network interface 714 may be configured to implement a local area network (LAN) or personal area network (PAN), via a suitable network protocol, e.g., Bluetooth, for a PAN. The computing device may optionally include a mass storage device 715 such as a disk drive, CD-ROM drive, tape drive, flash memory, or the like, and the mass storage device may store programs and/or data. The computing device may also include a user interface 716 to facilitate interaction between the system and a user. The user interface may include a monitor, Television screen, speakers, headphones or other devices that communicate information to the user.

The computing device 700 may include a network interface 714 to facilitate communication via an electronic communications network 720. The network interface 714 may be configured to implement wired or wireless communication over local area networks and wide area networks such as the Internet. The device 700 may send and receive data and/or requests for files via one or more message packets over the network 720. Message packets sent over the network 720 may temporarily be stored in a buffer 709 in memory 704.

In some implementations, the embedded Reductive Edging or embedded Edger 721 may be an embedded hardware component of client device 700, which may be coupled to the main processor, e.g., via the bus 705 or I/O components 707, and requests may be received from applications, e.g., streaming applications, running on the client device. In some implementations, the embedded Edger 721 may initiate and intercept network communications directed toward a CDN or other servers. In these implementations, the embedded Edger 721 may lack a network interface or the network interface may not be used. In other implementations, the embedded Edger, the functions of the edger may be implemented in streaming software 708 stored in the memory 704 or in programs 717 stored in the mass store 715 and executed on the processor 703.

In some alternative implementation the embedded Edger 721 may be an external device coupled to the client device 700, e.g., via a local non-network connection, such as the I/O functions 707.

The processor of the embedded Edger unit 721 may execute one or more instructions 724, portions of which may be stored in the edger memory 722 and the processor 723 may be operatively coupled to the memory 722 through a bus or bus type connection. The instructions 724 may be configured to implement the method for prefetching in a HLS systems shown in FIG. 2B as well as Error De-emphasis operations described in FIGS. 3-5B. Additionally the Memory 722 may contain instructions for storing Playlists in a HLS Library and a Protocol Stack defining HLS server locations. The Memory 722 may also contain the HLS Library 610, the Protocol Stack 611, and a coder/decoder (CODEC) 612 configured for use with media segments. The instructions 724 may further implement storage of media segments as data 725 during operation. The Instructions may implement alignment of playlists and decoding and encoding media segments as described in FIG. 5A. Alternatively, the HLS Library, Protocol stack and media segments may be stored on the client device 700 in the buffer 708 or as connection information 708 in memory 704 or as data 718 in the Mass Store 715.

While the above is a complete description of the preferred embodiment of the present disclosure, it is possible to use various alternatives, modifications and equivalents. It is to be understood that the above description is intended to be illustrative, and not restrictive. For example, while the flow diagrams in the figures show a particular order of operations performed by certain embodiments of the disclosure, it should be understood that such order is not required (e.g., alternative embodiments may perform the operations in a different order, combine certain operations, overlap certain operations, etc.). Furthermore, many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. The scope of the disclosure should therefore be determined with reference to the appended claims, along with the full scope of equivalents to which such claims are entitled. Any feature described herein, whether preferred or not, may be combined with any other feature described herein, whether preferred or not. In the claims that follow, the indefinite article "A", or "An"

refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A reductive edging device:
a processor;
memory coupled to the processor;
non-transitory instructions embedded in the memory that when executed by the processor cause the device to perform a method for reductive edging, the method comprising;
prior to sending a media segment to a client device, performing streaming error de-emphasis operations wherein performing streaming error de-emphasis includes sending a cached playlist, stored on the reductive edging device, to the client device when a response time for a playlist request sent to a Content Delivery Network (CDN) from the client device exceeds a threshold; and
sending information associated with the streaming error de-emphasis operations.

2. The Reductive Edging device of claim 1, wherein performing streaming error de-emphasis comprises sending a second request to the CDN for a playlist or the media segment after the failing to receive the corresponding playlist or media segment in response to a first request, without notifying the client device of the failure.

3. The Reductive Edging device of claim 2, wherein sending the media segment with streaming error de-emphasis comprises sending the media segment to the client device after sending the second or a subsequent request for the media segment to the CDN and receiving the media segment from the CDN.

4. The Reductive Edging device of claim 2, wherein sending information associated with streaming error de-emphasis comprises sending a failure status message to the client device after sending the second or a subsequent request for the playlist or the media segment to the CDN and failing to receive the requested playlist or media segment from the CDN.

5. The Reductive Edging device of claim 1, wherein performing streaming error de-emphasis comprises requesting a playlist or the media segment from a CDN before receiving a media segment request from the client device and failing to receive the requested playlist or media segment from the CDN, wherein sending the media segment with error de-emphasis comprises sending a failure status message to the client device.

6. The Reductive Edging device of claim 1, wherein performing streaming error de-emphasis comprises receiving a first and second playlist wherein timestamps of discontinuities in the second playlist do not match the timestamps of discontinuities in the first playlist; and
changing the timestamps of the discontinuities in the second playlist to match the first playlist.

7. The Reductive Edging device of claim 6, wherein performing streaming error de-emphasis further comprises receiving the media segment and subsequent media segments having discontinuities that do not match the discontinuities of the second playlist, wherein the media segment and subsequent media segments are in the second playlist;
decoding and aligning the discontinuities of the media segment and subsequent media segments to match the timestamps of the discontinuities in the second playlist.

8. The Reductive Edging device of claim 1, wherein performing streaming error de-emphasis comprises formatting discontinuities in a playlist such that the playlist is compatible with the client device.

9. The Reductive Edging device of claim 1, wherein performing streaming error de-emphasis comprises receiving a playlist including media streams at multiple bit-rates, choosing a single bit-rate based at least on network conditions and sending a playlist having a media stream at the single bit rate to the client device.

10. The Reductive Edging device of claim 1, wherein performing streaming error de-emphasis comprises sending to a CDN a second request for the media segment after it is determined that the media segment received in response to a first request is invalid.

11. The Reductive Edging device of claim 1, wherein performing streaming error de-emphasis comprises requesting media segments using an enhanced media streaming protocol.

12. The Reductive Edging device of claim 11, wherein the enhanced media streaming protocol is HTTP/2.

13. The Reductive Edging device of claim 11, wherein the enhanced media streaming protocol is WebRTC.

14. The Reductive Edging device of claim 11, wherein performing streaming error de-emphasis further comprises converting the requested media segment from the enhanced streaming protocol format to a format compatible with the client device.

15. The Reductive Edging device of claim 1, wherein performing streaming error de-emphasis comprises requesting the media segment from a playlist comprising media streams at multiple bit rates based on future network conditions predicted by a moving averages convergence and divergence algorithm.

16. A non-transitory computer readable medium having executable instructions embedded therein that when executed by a processor cause a device to perform a method for Reductive Edging, the method comprising;
prior to sending a media segment to a client device, performing streaming error de-emphasis operations wherein performing streaming error de-emphasis includes sending a cached playlist, stored by the processor, to the client device when a response time for a playlist request sent to a Content Delivery Network (CDN) from the client device exceeds a threshold; and
sending information associated with the streaming error de-emphasis operations.

17. The non-transitory computer readable medium of claim 16, wherein performing streaming error de-emphasis comprises sending a second request to the CDN for a playlist or the media segment after the failing to receive the corresponding playlist or media segment in response to a first request, without notifying the client device of the failure.

18. The non-transitory computer readable medium of claim 17, wherein sending the media segment with error de-emphasis comprises sending the media segment to the client device after sending the second or a subsequent request for the media segment to the CDN and receiving the media segment from the CDN.

19. The non-transitory computer readable medium of claim 17, wherein sending information associated with error de-emphasis comprises sending a failure status message to the client device after sending the second or a subsequent request for the playlist or the media segment to the CDN and failing to receive the requested playlist or media segment from the CDN.

20. The non-transitory computer readable medium of claim 16, wherein performing streaming error de-emphasis comprises requesting a playlist or the media segment from a CDN before receiving a media segment request from the client device and failing to receive the requested playlist or media segment from the CDN, wherein sending the media segment with error de-emphasis comprises sending a failure status message to the client device.

21. The non-transitory computer readable medium of claim 16, wherein performing streaming error de-emphasis comprises receiving a first and second playlist wherein timestamps of discontinuities in the second playlist do not match the timestamps of discontinuities in the first playlist; and changing the timestamps of the discontinuities in the second playlist to match the first playlist.

22. The non-transitory computer readable medium of claim 21, wherein performing streaming error de-emphasis further comprises receiving the media segment and subsequent media segments having discontinuities that do not match the discontinuities of the second playlist, wherein the media segment and subsequent media segments are in the second playlist;

decoding and aligning the discontinuities of the media segment and subsequent media segments to match the timestamps of the discontinuities in the second playlist.

23. The non-transitory computer readable medium of claim 16, wherein performing streaming error de-emphasis comprises formatting discontinuities in a playlist such that the playlist is compatible with the client device.

24. The non-transitory computer readable medium of claim 16, wherein performing streaming error de-emphasis comprises receiving a playlist including media streams at multiple bit-rates, choosing a single bit-rate based at least on network conditions and sending a playlist having a media stream at the single bit rate to the client device.

25. The non-transitory computer readable medium of claim 16, wherein performing streaming error de-emphasis comprises sending to a CDN a second request for the media segment after it is determined that the media segment received in response to a first request is invalid.

26. The non-transitory computer readable medium of claim 16, wherein performing streaming error de-emphasis comprises requesting media segments using an enhanced media streaming protocol.

27. The non-transitory computer readable medium of claim 26, wherein the enhanced media streaming protocol are HTTP2.

28. The non-transitory computer readable medium of claim 26, wherein the enhanced media streaming protocol are WebRTC.

29. The non-transitory computer readable medium of claim 26, wherein performing streaming error de-emphasis further comprises converting the requested media segment from the enhanced streaming protocol format to a format compatible with the client device.

30. The non-transitory computer readable medium of claim 16, wherein performing streaming error de-emphasis comprises requesting the media segment from a playlist comprising media streams at multiple bit rates based on future network conditions predicted by a moving averages convergence and divergence algorithm.

* * * * *